Nov. 12, 1935.    A. W. FORSTER    2,020,407
MEANS FOR THE REENFORCEMENT OF SHEATHING FOR BEAMS
Filed Sept. 2, 1933    2 Sheets-Sheet 2
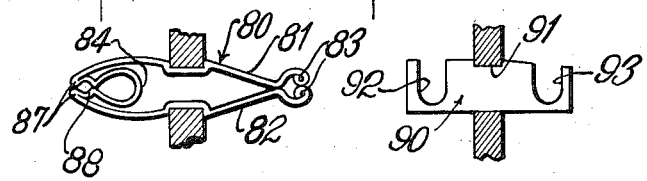
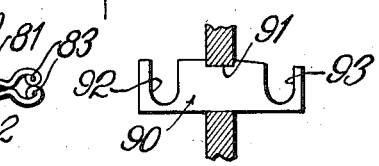
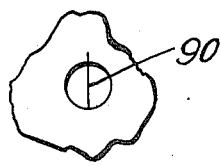
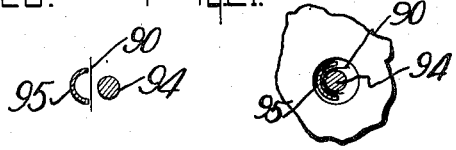
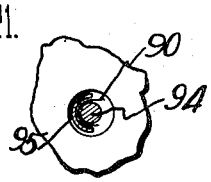
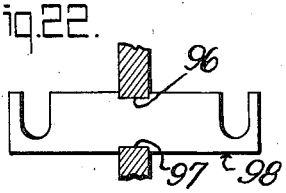
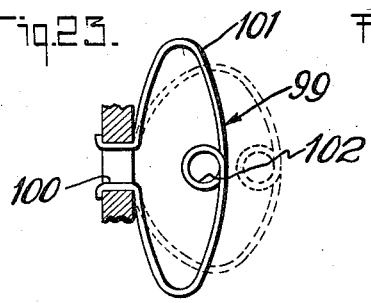
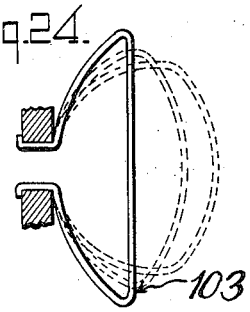
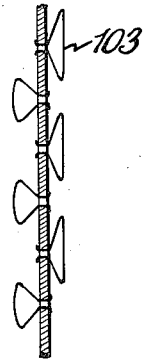
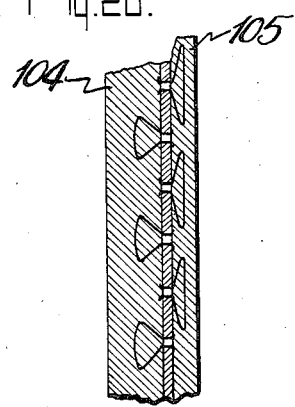
INVENTOR
Alois W. Forster
BY Warfield & Brown
ATTORNEYS Patented Nov. 12, 1935

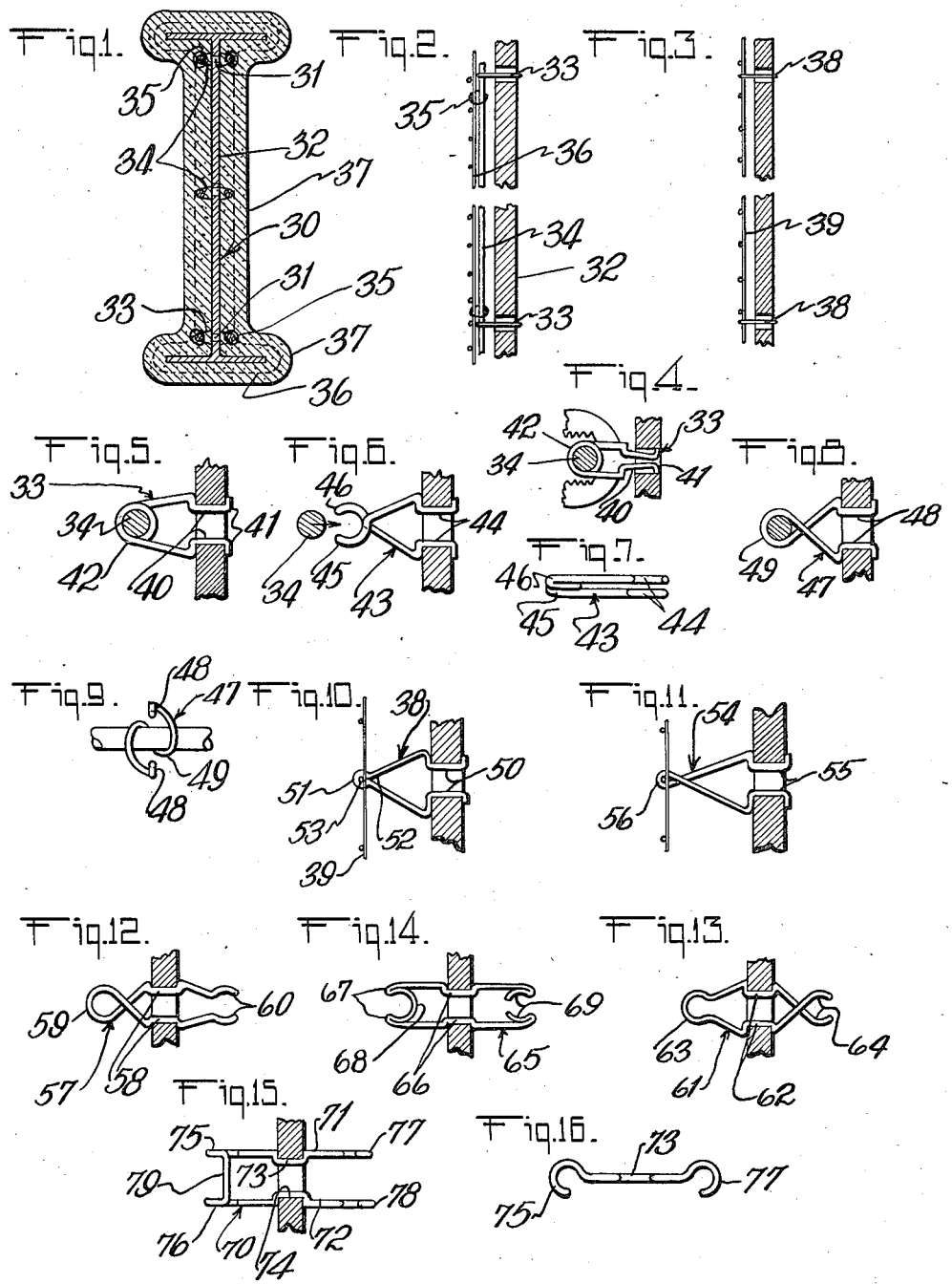

2,020,407

UNITED STATES PATENT OFFICE 2,020,407

MEANS FOR THE REENFORCEMENT OF SHEATHING FOR BEAMS

Alois W. Forster, Garden City, N. Y.

Application September 2, 1933, Serial No. 687,932

5 Claims. (Cl. 72—61)

This invention relates to the sheathing of metal structural members with reenforced cementitious material and more particularly to structures especially designed for the application of cementitious material, and to correlated improvements and discoveries appertaining thereto.

An object of the invention is the provision in connection with a metal beam of simple and readily installed members whereby properly spaced reenforcement for cementitious material is provided.

Another object is the provision of improved spacer means for reenforcing elements.

Another object is the provision of means readily insertable into a hole in the beam and which extends outwardly therefrom in a desirable manner.

A further object is the provision of an improved method for sheathing a metal beam.

Other objects of the invention will in part be obvious and will in part appear hereinafter.

The invention accordingly comprises the features of construction, combination of elements and arrangements of parts as well as the several steps and the relation and order of one or more of such steps with respect to each of the others, all as exemplified in the following detailed disclosure and the scope of the application of which will be indicated in the claims.

For a fuller understanding of the nature and objects of the invention, reference should be had to the following detailed description taken in connection with the accompanying drawings, in which:

Figure 1 is a vertical sectional view of a structure embodying the invention, showing the same sheathed;

Fig 2 is an enlarged detail horizontal sectional view of a structure embodying the invention;

Fig. 3 is an enlarged horizontal sectional detail view of another form of structure embodying the invention;

Fig. 4 is a fragmentary sectional view, looking from the side, showing one form of clip carrying a rod and ready for insertion;

Fig. 5 is a similar view showing the clip inserted;

Fig. 6 is a similar view of another form of clip inserted and ready for the reception of a rod;

Fig. 7 is a side view of the clip shown in Fig. 6;

Fig. 8 is a view similar to Fig. 5 showing another form of clip carrying a rod;

Fig. 9 is a view from the right-hand side of Fig. 8;

Fig. 10 is a view similar to Fig. 5 showing another form of clip carrying a mesh screen;

Fig. 11 is a similar view showing another form of clip;

Figs. 12 and 13 are views showing, respectively, forms of double-ended clips carrying one rod and ready for the insertion of another rod;

Fig. 14 is a similar rod of another form of clip ready for the insertion of two rods;

Fig. 15 is a view similar to Fig. 5, but looking from the top showing a broader form of double-ended clip;

Fig. 16 is a side view of clip shown in Fig. 15;

Fig. 17 is a view of another form of double-ended clip ready for the reception of wire mesh;

Fig. 18 is a view similar to Fig. 16 showing another form of clip;

Fig. 19 is a view taken from the left-hand end of Fig. 18;

Figs. 20 and 21 are fragmentary sectional views illustrating the manipulation of the clip Figs. 18 and 19 for the insertion thereof;

Fig. 22 is a view similar to Fig. 18, showing a modified form of clip;

Fig. 23 is a view similar to Fig. 5 showing a form of clip which is adapted to variously position a rod;

Fig. 24 shows a structure similar to that of Fig. 23 and adapted to be used without a rod;

Fig. 25 is a sectional view illustrating one manner of use of the structure shown in Fig. 24; and Fig. 26 is a view of the structure sheathed.

In the sheathing of metal structural members of the nature of beams (which will be described herein by the term "beams" for the sake of facility of expression) it is common practice to provide reenforcement of cementitious material, which may be cement applied by a cement gun, or cement, concrete or other sheathing material applied in any suitable manner. Such reenforcement ordinarily includes coarse wire mesh encircling the beam and drawn inwardly adjacent its web. The mesh is ordinarily held in place by being fastened to rods which in turn are held against the web by wires threaded through holes in the web and tied. The fastening of these rods is usually a clumsy and cumbersome proceeding, since it is necessary to have a man on each side of the beam (which is sometimes as much as twelve feet in height), one man acting to hold one rod and to thread the wire through the hole, and the other man acting to hold the other rod and to tie the wire. Furthermore, difficulties have been experienced in getting the cement or concrete between the rods and the web of the beam. Furthermore, a great drawback to this type of construction is that for all except the thinnest sheathing layers, the wire mesh is toward the inside of the layer instead of in the center of the layer, thus providing much less effective reenforcement than would be the case if the mesh were approximately at the central point between the outer surface of the sheathing layer and the web. In instances wherein it is desirable to dispense with the rods altogether, many difficulties have obtained in properly holding the wire mesh in place.

With the foregoing and other difficulties in view, the invention contemplates the provision in combination with a metal beam of reenforcing means which may be of the rod, wire mesh, or other type, or a suitable combination of reenforcing members of two or more types, and of spacer members adapted to be securely held in the holes in the beam and to hold the reenforcing member or members securely against inward displacement, and it also contemplates the provision of a variety of types of spacer members to this end. The invention furthermore contemplates various procedures and elements whereby the formation of properly sheathed beams may be facilitated and enhanced.

In Fig. 1, there is exemplified one form of structure embodying the invention, the sheathing being shown in place. An I-beam 30 is formed with holes 31 in its web 32. In each hole there are two spacer clips 33 which may be of the type shown in Figs. 4 and 5 and which may be inserted from either side of the web. The clips 33 on each side of the web carry reenforcing rods 34, which as exemplified, run horizontally, but which may run vertically if desired. The clips may be in any desired position in the hole to properly hold the rod or other reenforcement. To these rods there is secured, as by means of the usual metal attaching members 35, a reenforcing screen 36 of coarse wire mesh. As will be seen, the mesh and the rods are held substantially in the middle of the sheathing layer 37 which is applied about the beam.

In Fig. 2, the clips 33 are shown from the top and on a larger scale as holding rods 34 which may be utilized with or without a wire screen as desired; and in Fig. 3 there is shown on a larger scale clips 38 which may be of the type illustrated in Fig. 10 holding a reenforcing screen 39 without rods.

In Figs. 4 and 5, the clips 33 are shown on a larger scale. These clips comprise resilient prongs 40 having turned-over ends 41 and a loop portion 42 adapted to hold a rod 34. After the loop portion 42 has been slid over the end of the rod, the clip may be seized between plyers, as shown in Fig. 4, and the prongs 40 slid into the hole 31 and released to take the position shown in Fig. 5. Wire mesh may thereafter be secured to the rod if desired. The clip is preferably formed of relatively stiff springy wire.

As will be apparent a wide variety of forms of clips may be utilized, several of these being specifically exemplified. It is to be understood that so long as ample room between the reenforcing member and the web of the beam is left for the reception of cementitious material, the spacing of the outer portion of the clip and the beam may be varied to suit varying thicknesses of cementitious material which may be required as sheathing in various instances.

In many instances it is desirable to form the clip so that the rod or other reenforcing member may be inserted in the clip after the clip has been inserted in the beam. One type of construction embodying this feature of the invention is illustrated in Fig. 6, wherein the clip 43 is formed with resilient prongs 44 similar to the prongs 40 and the wire bent upon itself as indicated in Fig. 7 to provide inwardly resilient prongs 45 and 46 for receiving therebetween a rod 34 after the prongs 44 are in place. The prongs 45 and 46 not only encompass the rod, but grip the same firmly therebetween. An additional advantage of the type of construction including a loop or inwardly resilient member is that the rod is encompassed, i. e., surrounded at more than half its extent—so that it is held within the clip regardless of the position of the beam with respect to the horizontal. It may be noted in this connection that while the primary aim of the invention is to maintain reenforcing members in position relative to the vertical web of a beam, the invention in many of its aspects is adapted for use in maintaining reenforcing members in position with respect to webs which are in other positions. For the sake of facility of expression, the term "vertical" is used herein to describe elements which are at an angle of 45° or more with the horizontal.

In instances wherein it is undesirable to slip the loop of a clip over a rod, but wherein it is desirable to have the rod within a loop, a construction such as shown in Figs. 8 and 9 may be utilized. In this form of construction, the wire from which the clip 47 is formed is crossed upon itself to provide outwardly resilient prongs 48 and a loop 49. The crossed portions of the wire are spaced from each other so that a rod may be inserted in one position and then swung into a perpendicular position.

As will be understood, the clip may be variously modified to receive types of reenforcing members other than a rod. In Figs. 10 and 11, there are illustrated forms of clips adapted to receive a wire of a mesh screen to maintain the same in spaced relationship from a beam. In Fig. 10, the clip 38 having holding prongs 50 is formed with a small loop 51, the inner edges of which are brought together as at 52, so that they will spring apart as a wire 53 of the screen 39 is pressed through and then will spring together again so as to prevent inward movement of the wire 53. In Fig. 11, the clip 54 formed with holding prongs 55 has a small loop 56 provided by crossing the wire upon itself. The crossed portions of the wire are spaced just enough so that they will spread as the wire is twisted through the wire of a screen and will come together to hold the screen wire against inward movement toward the web of the beam.

In certain instances where it is desirable to provide reenforcing members on each side of the web of the beam the necessity of inserting a clip from both sides of the web may be avoided by the use of a double-ended clip. Types of clips of this nature are illustrated in Figs. 12, 13, 14 and 15 and 16. In Fig. 12 there is shown a clip 57 having outwardly resilient members 58 at its central portion, a rod-retaining loop at one end, and inwardly resilient arms 60 for the reception and retention of a rod at the other end. In Fig. 13 there is shown a clip 61 having outwardly resilient central members 62, and open loop 63 at one end, and crossed inwardly resilient prongs 64 at the other end. Whereas in both these constructions it is necessary to introduce one of the rods before the clip is inserted in the hole, there may be used a construction such as shown in Fig. 14 wherein both rods may be introduced after the insertion of the clip. In the exemplified construction there is shown a clip 65 having outwardly resilient members 66 at its central portion, inwardly resilient arms 67 connected at 68 at one end, and inwardly resilient unconnected arms 69 at the other end. In Figs. 15 and 16 there is shown a clip 70 wherein the rod may be laid in from above when the web of the beam is vertical. This clip comprises a pair of arms 71 and 72 which are outwardly resilient and have inwardly extending recesses 73 and 74 therein at their central portions. The respective rods are formed with inwardly resilient hooks 75 and 76 at one end and with inwardly resilient hooks 77 and 78 at the other end, the point of the hooks 75 and 76 being connected by a transverse portion 79.

In Fig. 17, there is shown a double-ended clip 80 adapted for the reception of a wire of a screen at both ends after the clip is in place. The clip comprises two arms 81 and 82, each formed with notched outwardly resilient central portions 83 and connected at one end by an inwardly extending loop 84. Adjacent the ends of the loop the wire is formed with outwardly bent, inwardly resilient portions 83 to provide a holding member into which the wire of a screen may be pushed. At the other end of the clip, the arms are formed with nubs 87 and twists 88 which provide in connection with the inward resiliency of the arms at this point another holding member for a wire of a screen.

As will be understood spacing members formed of other materials than wire may readily be employed. One form of such member is shown in Fig. 18 and consists of a clip 90 comprising a strip of resilient material formed with a central notch at 91 and with recesses 92 and 93 at its ends for the reception of rods. Such a clip may be inserted in the hole in the beam by a suitable tool such as, for instance, a pair of pliers including a round arm 94 and a curved arm 95 such as shown in Fig. 20. The clip 90 is compressed into a laterally curved position and inserted in such position into the hole as indicated in Fig. 21 to a position where the notch 91 registers with the hole. The clip is then permitted to expand into its normal flat position wherein it is held firmly within the hole by the edges of the notch 91.

If desired, a clip provided with two notches as shown at 96 and 97 in the clip 98 shown in Fig. 22, may be utilized. The clip as shown is adapted to be used for a thicker sheathing than is the clip 90 of Fig. 18.

In certain instances there may be provided a clip which is expansible so that the same may be adjusted for use in connection with different thicknesses of sheathing. One form of such a clip is shown in Fig. 23. This clip 99 is formed of wire having outwardly resilient prongs 100 for retention of the clip in the hole and a flexible extended body portion 101, including a rod-retaining loop 102. The body portion 101 because of its extent and flexibility may be adjusted to various positions to bring the rod-containing loop to any desired distance from the beam, as indicated by the full and dotted lines in Fig. 23.

Clips of this construction may indeed be utilized in accordance with the invention without any supplemental reinforcing members and for such uses the loop may be eliminated if desired. A clip of this sort is indicated at 103 in Fig. 24, wherein the full and dotted lines show various positions to which the flexible extended body portion may be moved. In the utilization of clips of this nature a multiplicity of holes fairly near each other will be formed in the beam and one or more clips will be inserted in each hole, the clips themselves in this instance constituting the entire reinforcing means as indicated in Figs. 25 and 26. In these figures the clips are shown bent outwardly more at one side than at the other so that the sheathing 104 at one side may be thicker than the sheathing 105 at the other side and may still be properly reinforced.

It will be understood that the invention in its broader aspects is adapted for use in the reenforcement of cementitious material applied to any part of any metallic structural member, as well as on its web.

Since certain changes in the construction and procedures set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A spacer clip comprising a resilient strip adapted to be inserted into a hole in a beam in transversely curved position and to spring outwardly when released within said hole, and formed with means to maintain a reenforcing member in spaced relationship to said beam.

2. In a structure of the character described, the combination with a metal beam having clip-retaining holes therein, of a plurality of clips, each clip being formed with resilient means for holding itself securely within a hole and having a portion spaced from said beam and adapted to securely maintain a reenforcing member in spaced relation to said beam, said portion being flexible and of sufficient extent so that it may be disposed at any desired position with respect to said beam.

3. In a structure of the character described, the combination with a metal beam having a plurality of spacer-retaining holes therein, a wire mesh member adapted to act as a reenforcement for a sheathing, a plurality of spacer clips each comprising a piece of resilient wire bent upon itself and formed so that the portions thereof closely approach each other at a point slightly removed from the bend to retain a wire of the wire-mesh reenforcing element in spaced relation to said beam, and so as to widen out, narrow, and widen out again at a point remote from said bend to retain itself in a beam in which it is inserted by compressing its ends, each spacer clip encompassing a wire of said wire mesh at a point adjacent said bend and being inserted in one of said holes at the point where it narrows.

4. In a structure of the character described, the combination with a metal beam having a plurality of spacer retaining holes therein, of spacer members in said holes, each of said spacer members being formed with outwardly resilient means for holding itself in a hole when pressed therein and having shoulder portions adapted to embrace the beam at the opposite ends of the hole and a retaining portion spaced from said shoulder portions and adapted to securely maintain a reenforcing element in fixed spaced relationship to said beam, and each hole being of a size to permit the spacer member to be pressed into it when the resilient means is compressed, and reenforcing means in said retaining portions.

5. In a structure of the character described, the combination with a metal beam having a plurality of spacer-retaining holes therein, of spacer members in said holes, each of said spacer members being formed with outwardly resilient means for holding itself in a hole when pressed therein and having shoulder portions adapted to embrace the beam at the opposite ends of the hole and retaining portions spaced from said shoulder portions and adapted to securely maintain a reenforcing element in fixed spaced relationship to said beam at both sides of the hole, and each hole being of a size to permit the spacer member to be pressed into it when the resilient means is compressed, and reenforcing means in said retaining portions.

ALOIS W. FORSTER.